United States Patent [19]

Bobar et al.

[11] Patent Number: 4,968,763

[45] Date of Patent: Nov. 6, 1990

[54] VINYL CHLORIDE COPOLYMERS

[75] Inventors: Georg Bobar, Bad Duerkheim; Hans-Joachim Krause, Ludwigshafen; Gernot Leib, Frankenthal, all of Fed. Rep. of Germany

[73] Assignee: BASF Aktiengesellschaft, Ludwigshafen, Fed. Rep. of Germany

[21] Appl. No.: 400,408

[22] Filed: Aug. 30, 1989

[30] Foreign Application Priority Data

Sep. 1, 1988 [DE] Fed. Rep. of Germany ....... 3829711

[51] Int. Cl.$^5$ .............................................. C08F 24/00
[52] U.S. Cl. .................................. 526/273; 526/329.6; 526/332; 526/345
[58] Field of Search ..................... 526/273, 329.6, 332, 526/345

[56] References Cited

U.S. PATENT DOCUMENTS 3,472,914 10/1969 Comstock et al. .................. 526/263

FOREIGN PATENT DOCUMENTS 0013371 7/1980 European Pat. Off. .
0020159 12/1980 European Pat. Off. .
745424 5/1943 Fed. Rep. of Germany .

OTHER PUBLICATIONS

N. Naidus, "Industrial and Engineering Chemistry", vol. 45, No. 4, pp. 712-717 (1953).

*Primary Examiner*—Joseph L. Schofer
*Assistant Examiner*—Alex H. Walker
*Attorney, Agent, or Firm*—Keil & Weinkauf

[57] ABSTRACT

Vinyl chloride copolymers of (a) from 60 to 78 parts by weight of vinyl chloride, (b) from 1 to 20 parts by weight of glycidyl methacrylate and (c) from 12 to 40 parts by weight of compounds copolymerizable with (a) and (b) have viscosity values, measured in 20% strength by weight toluene solution at 23° C., of from 10 to 100 mPa.s.

2 Claims, No Drawings

VINYL CHLORIDE COPOLYMERS

The present invention relates to vinyl chloride copolymers of (a) from 60 to 78 parts by weight of vinyl chloride, (b) from 1 to 20 parts by weight of glycidyl methacrylate and (c) from 12 to 40 parts by weight of compounds copolymerizable with (a) and (b), having viscosity values, measured in 20% strength by weight toluene solution at 23° C., of from 10 to 100 mPa.s.

Such vinyl chloride copolymers are products which are processible into binders for coatings or into powders. The polymer dispersions contain the polymer in very finely divided form, with water as the external phase. In the polymer solutions, the polymers are present in a completely homogeneous form in an organic solvent such as an ester, ketone or alcohol.

Vinyl chloride copolymers, in particular those for use in the field of coatings, generally tend to yellow. This yellowing tendency is a function of time, temperature and radiation intensity.

A number of measures have been adopted to eliminate this defect. For instance, substances such as epoxidated soybean oil or alkalis such as NaOH or amines have been added to reduce the yellowing tendency.

While volatile additives evaporate, higher molecular weight substances, such as plasticizers, may migrate; whether toward the surface or into the substrate, in either case the substance intended to counteract the yellowing disappears from the layer to be protected. Additions of alkali cause defects such as haze and increased water absorption, noticeable as blushing on immersion of film in water.

It is an object of the present invention to provide binders based on vinyl chloride copolymers which are more resistant to yellowing than prior art binders and where the abovementioned disadvantage of blushing on immersion in water does not occur.

We have found that this object is achieved by the vinyl chloride copolymers defined at the beginning.

Preferred comonomers (c) for inclusion in the copolymerization of vinyl chloride with glycidyl methacrylate are compounds of the class of the acrylic and methacrylic esters such as butyl acrylate, vinyl carboxylates such as vinyl propionate, vinyl ethers such as vinyl isobutyl ether, vinyllactams such as vinylcaprolactam and maleic or fumaric esters such as dimethyl maleate and diethyl maleate. Particular preference is given to vinyl isobutyl ether.

Preference is further given to vinyl chloride copolymers where the copolymerizable compounds (c) are a combination of the abovementioned compounds.

Polymer dispersions and solutions which contain vinyl chloride copolymers and the preparation thereof by emulsion or solution polymerization of the monomers are sufficiently well-known that no further details are required. The following publications are of interest in this context: Ullmanns Encyklopädie der technischen Chemie, Verlag Chemie, Weinheim (1980), 4th edition, volume 19, pages 344 to 347, 384 to 385 and volume 15, pages 607 to 609; Encyclopedia of Polymer Science and Technology, J. Wiley publishers, New York (1971), volume 14, pages 330 to 345; B. Vollmert, Grundriß der makromolekularen Chemie, Springer-Verlag (1962), pages 72 to 94; and H. Naidus, Emulsion polymerization for paints, Ind. Eng. Chem. 45 (1953), 712–717. Of particular interest are the processes described in DE-C-745,424 and EP-A-13,371, and EP-A-20,159.

The vinyl chloride copolymers contain from 60 to 90, preferably from 70 to 80, parts by weight of vinyl chloride, from 1 to 20, preferably from 2 to 5, parts by weight of glycidyl methacrylate and from 12 to 40, preferably from 20 to 30, parts by weight of copolymerizable compounds (c) as copolymerized units. The viscosity values, measured in 20% strength by weight toluene solution at 23° C., are from 10 to 100, preferably from 12 to 70, mPa.s, which corresponds to an average molecular weight $M_w$ of from $10^4$ to $10^5$ or from $2 \times 10^4$ to $6 \times 10^4$. The viscosity is measured by the method described in German Standard Specification DIN 53019.

An emulsion polymerization for preparing the vinyl chloride copolymer is carried out in the presence of water, initiator (usually sodium peroxydisulfate) and other assistants such as sodium sulfonates of from 10 to 16 carbon atoms in customary amounts. The polymerization apparatus is a stirred reactor in which the copolymerization takes place with thorough mixing of the reactants, preferably at from 50° to 70° C. After the copolymerization has ended, the copolymer is precipitated, filtered, washed and dried in a conventional manner.

A solution polymerization is advantageously carried out in 50% strength by weight concentration in a solvent such as ethyl acetate at from 40° to 70° C. using an inorganic initiator such as tert-butyl peroctoate.

It is an advantage of the vinyl chloride copolymer according to the invention that it shows excellent yellowing resistance without the disadvantage of blushing on immersion of a film in water.

The vinyl chloride/glycidyl methacrylate copolymer according to the invention can be used for preparing binders for coatings. The present invention is further illustrated in the Operative and Comparative Examples.

COMPARATIVE EXAMPLE A

A copolymer of 80 parts by weight of vinyl chloride, 10 parts by weight of dimethyl maleate and 10 parts by weight of diethyl maleate was prepared by emulsion polymerization, and the copolymer was precipitated, filtered, washed, stabilized with sodium carbonate and dried.

The viscosity of a 20% strength by weight solution in 1:1 methyl ethyl ketone/toluene at 23° C. was 97 mPa.s.

The heat stability test at 100° C. for 2 hours produced a color number of 200 on the iodine scale.

The degree of blushing produced by 8 days' immersion in water was rated 5 on a scale from 1 (very good) to 5 (poor).

OPERATIVE EXAMPLE 1

A copolymer of 76.2 parts by weight of vinyl chloride, 9.5 parts by weight of dimethyl maleate, 9.5 parts by weight of diethyl maleate and 4.8 parts by weight of glycidyl methacrylate was prepared as described in Comparative Example A.

The viscosity of a 20% strength by weight solution in 1:1 methyl ethyl ketone/toluene at 23° C. was 80 mPa.s.

The heat stability test at 100° C. for 2 hours produced a color number of 15 on the iodine scale. The degree of blushing produced by 8 days' immersion in water was rated 1 on a scale from 1 (very good) to 5 (poor).

COMPARATIVE EXAMPLE B

A copolymer of 75 parts by weight of vinyl chloride and 25 parts by weight of vinyl isobutyl ether was prepared by emulsion polymerization, precipitated, filtered, washed and dried.

The viscosity of a 20% strength by weight solution in toluene, measured at 20° C. with an STVK type Drage pseudoplasticitymeter using measuring system A 111, was 24 mPa.s.

The heat stability test at 125° C. for 12 hours produced a color number of 1000 on the iodine scale. The degree cf blushing produced by 8 days', immersion in water was rated 1 on a scale from 1 (very good) to 5 (poor).

COMPARATIVE EXAMPLE C

A copolymer was prepared as described in Comparative Example B and, after filtration, stabilized with dilute sodium hydroxide solution. It was then dried, and its NaOH content was found to be 0.2% by weight. The viscosity of 20% strength by weight solution in toluene, measured at 23° C. with an STVK type Drage pseudoplasticitymeter using measuring system A 111, was 26 mPa.s.

The heat stability test at 125° C. for 12 hours produced a color number of 70 on the iodine scale. The degree of blushing produced by 8 days' immersion in water was rated 5 on a scale from 1 (very good) to 5 (poor).

OPERATIVE EXAMPLE 2

A copolymer of 72 parts by weight of vinyl chloride, 24 parts by weight of vinyl isobutyl ether and 4 parts by weight of glycidyl methacrylate was prepared by the method of Comparative Example B.

The viscosity of a 20% strength by weight solution in toluene, measured at 23° C. with an STVK type Drage pseudoplasticitymeter using measuring system A 111, was 24 mPa.s.

The heat stability test at 125° C. for 12 hours produced a color number of 3 on the iodine scale. The degree of blushing produced by 8 days', immersion in water was rated 1 on a scale from 1 (very good) to 5 (poor).

COMPARATIVE EXAMPLE D

A copolymer of 77.5 parts by weight of vinyl chloride and 22.5 parts by weight of diisobutyl maleate was prepared in a conventional manner by emulsion polymerization, precipitated, filtered, stabilized and dried. The viscosity of a 20% strength by weight toluene solution at 23° C. was 95 mPa.s.

The heat stability test at 100° C. for 2 hours produced a color number of 300 on the iodine scale. The degree of blushing produced by 8 days', immersion in water was rated 5 on a scale from 1 (very good) to 5 (poor).

OPERATIVE EXAMPLE 3

A copolymer of 76 parts by weight of vinyl chloride, 22 parts by weight of diisobutyl maleate and 2 parts by weight of glycidyl methacrylate was prepared by emulsion polymerization, precipitated, filtered, washed and dried.

The viscosity of a 20% strength by weight toluene solution at 23° C. was 76 mPa.s. The heat stability test at 10° C. for 2 hours produced a color number of 15 on the iodine scale. The degree of blushing produced by 8 days', immersion in water was rated 1 on a scale from 1 (very good) to 5 (poor).

We claim:

1. A vinyl chloride copolymer of (a) from 60–78 parts by weight of vinyl chloride, (b) from 1 to 20 parts by weight of glycidyl methacrylate and (c) from 12 to 40 parts by weight of vinyl isobutyl ether copolymerized with (a) and (b), the vinyl chloride copolymer having a viscosity, measured in 20% strength by weight toluene solution at 23° C., of from 10 to 100 mPa.s.

2. A vinyl chloride copolymer as claimed in claim 1, obtainable by emulsion polymerization or solution polymerization.

* * * * *